United States Patent [19]

Williams

[11] 3,878,012

[45] Apr. 15, 1975

[54] DEVICE AND METHOD FOR FISHING ROD REPAIR

[76] Inventor: Lee F. Williams, Rt. 3, Box 89, Moses Lake, Wash. 98837

[22] Filed: Dec. 20, 1973

[21] Appl. No.: 426,530

[52] U.S. Cl......... 156/94; 29/401; 43/18 R; 138/97; 156/294; 264/36; 285/15; 403/11; 403/292
[51] Int. Cl............................................. B32b 35/00
[58] Field of Search........... 144/310 R; 29/401, 402; 138/97; 264/36; 156/94, 293, 294; 285/15; 161/118, 119; 43/18 R, 18 GF; 403/11, 289, 292, 265, 406

[56] References Cited
UNITED STATES PATENTS

| | | | |
|---|---|---|---|
| 3,310,903 | 3/1967 | Binvignat | 43/18 GF |
| 3,389,046 | 6/1968 | Burness | 156/94 X |

*Primary Examiner*—Edward G. Whitby
*Attorney, Agent, or Firm*—Wells, St. Jonn & Roberts

[57] ABSTRACT

A repair device and method facilitating rejoining of two broken pieces of a hollow tapered fishing rod. The device includes an insert that is tapered similarly to the taper within the interior bore of the broken rod. An enlarged end of the insert is provided with a number of longitudinal slots extending from that end toward a reduced end. The slots allow radial compression of the enlarged end to enable its insertion within the broken rod. The insert includes, at some point along its length, a cross-sectional exterior diameter substantially equal to the diameter of the rod bore at the break point. The insert is situated within the rod bore so the complementary cross-sectional diameters are aligned, thereby providing a surface to surface fit between the exterior of the insert and the interior of the rod bore. The insert fits within the broken sections so that approximately half the length of the insert is engaged within each broken section, the broken ends being butted together to complete the repair. A hollow sleeve is also provided to insure surface to surface engagement of the exterior surface of the insert with the interior surface or wall of the bore. The sleeve is tapered similarly to the interior bore of the insert so it may be slidably adjusted within the bore of the insert to urge the compressible sections of the enlarged insert end outwardly against the walls of the rod bore.

7 Claims, 7 Drawing Figures

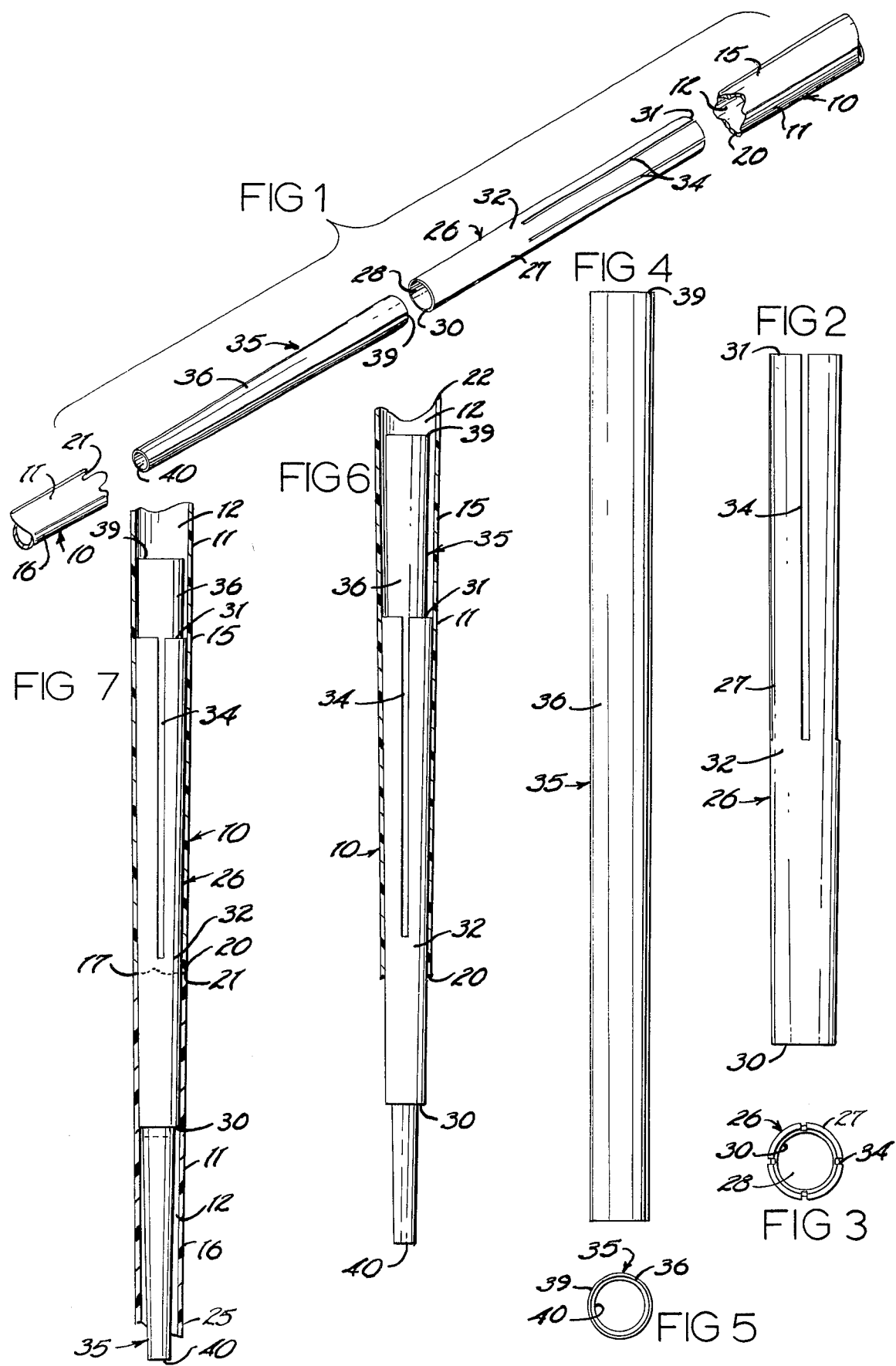

DEVICE AND METHOD FOR FISHING ROD REPAIR

BACKGROUND OF THE INVENTION

Repair of broken fising rods, particularly those constructed of a hollow tapered shaft, has proven to be an extremely difficult task. This problem occurs primarily because the rodu usually includes a central bore that is tapered similarly to the tapered exterior surface of the rod. It is very rod to rejoin broken ends of such a rod section since the tapered bore prohibits use of a cylindrical dowel pin, and the external use of a sleeve or ferrule distracts from the appearance of the rod and limits the flexibility of the repaired section.

A United States patent granted to R.M. Roberts, U.S. Pat. No. 2,100,873 discloses a dowel structure for holding together two separate elements having aligned coextensive apertures. The dowel structure itself is cylindrical in configuration having a tapered bore extending between ends thereof. A tapered pin is provided to fit within the dowel bore. The dowel includes longitudinal slots extending inwardly from both ends. The slots are angularly spaced so they overlap one another at the mid section of the dowel. Once inserted, then forced into the dowel bore, the tapered pin serves to force the dowel to radially expand. The dowel is designed to be placed within an aligned set of apertures having cross-sectional diameters substantially equal to the diameter of the dowel. The dowel may be inserted so that it extends into both aligned apertures. The pin is then inserted and driven into the dowel bore to expand the cross-sectional diameter of the dowel and thereby produce radial pressure against the sides of the aligned holes.

The Roberts device is primarily concerned with completing a very rigid connection between two elements having aligned cylindrical bores. Since the exterior surface of the dowel is cylindrical, the apparatus is not serviceable for the purpose of repairing or reconnecting two elements having complementary tapered bores for receiving the dowel. Since the dowel pin serves to uniformly expand the cylindrical surface of the dowel along its length, it follows that use of this device would be serviceable only when utilized with complementary clindrical bores between elements. Further, in order to utilize the Roberts device, the user must preferably have access to the dowel and pin assembly from both ends of the aligned bores.

The apparatus of the present invention comprises an elongated, tapered insert having a number of slots extending longitudinally inward from an enlarged end. The insert is tubular and the slots enable the enlarged end section to be radially compressed to allow the insert to be mounted within a tapered bore through an opening of smaller cross-sectional diameter then the enlarged end. Resiliency of the insert allows the enlarged end to return to its normal condition within the bore after insertion. Thus, when properly aligned within the bore, the exterior surfaces of the insert come into surface to surface contact with the walls of the bore. In this positon, the reduced end of the insert protrudes outwardly from the broken rod section to receive and mount the remaining broken rod section with the broken ends in abutment with one another.

SUMMARY OF THE INVENTION

An apparatus and method for repairing fishing rods is disclosed herein, utilizing an elongated insert having an exterior surface tapered to match the taper of a longitudinal bore within a fishing rod that has been broken in two separate pieces. The insert includes an enlarged end and a reduced end. The ends are respectively greater and smaller in cross-sectional diameter than the diameter of the rod bore at the fracture line between the two broken pieces. The insert further includes a mid section between the enlarged and reduced ends that includes a cross-sectional diameter equal to the cross-sectional diameter of the bore at the fracture line of the two pieces. A slot extends longitudinally from the enlarged insert end to the mid section in order that the enlarged end may be compressed radially to permit its insertion into the bore of one of the rod pieces. The bore of said one piece extends from the open broken end thereof toward an enlarged end. The insert may be slidably located within the bore so that the mid section thereof is positioned at the open broken end of said one piece with its reduced insert end protruding outwardly therefrom. The second piece of the rod section may then be joined to said one piece by placing the protruding end of the insert into the broken open end of the remaining piece and butting the complementary end edges against one another.

It is a primary object of the present invention to provide a method and apparatus for repairing fishing poles that will not substantially reduce the normal flexibility of the rod at the broken area.

A further object is to provide such a device that is operable to repair fishing rods from within the central bore of the rod.

It is an additional object to provide such a device that is extremely simple in construction and may therefore be inexpensive to purchase and utilize.

It is a yet further object of my invention to provide such a device that may be manufactured in varying sizes to accommodate or facilitate repair of fishing rods having varying inner bore diameters.

These and further objects and advantages will become evident upon reading the following description which, taken with the accompanying drawings, disclose a preferred form of the present invention.

A BRIEF DESCRIPTION OF THE DRAWINGS

A preferred embodiment of the present invention is illustrated in the accompanying drawings in which:

FIG. 1 is an exploded pictorial view of the device in alignment with two separate rod pieces;

FIG. 2 is an elevational view of the insert;

FIG. 3 is a plan view of the insert illustrated in FIG. 2;

FIG. 4 is an elevational view of the sleeve;

FIG. 5 is a plan view of the sleeve illustrated in FIG. 4;

FIG. 6 is a slightly reduced elevational view of the insert and sleeve as shown in FIGS. 2 and 4 assembled and mounted within one piece of a broken rod section; and FIG. 7 is a view similar to FIG. 6 only showing the completed condition of the rod repair with the one piece joined to the remaining piece of the borken section.

DETAILED DESCRIPTION OF A PREFERRED EMBODIMENT

The device and method of operation of the present invention is intended primarily for use in repairing broken fishing rods of the type formed of a synthetic resin or other flexible material. Such rods typically include a tapered exterior surface 11 and a bore 12 extending longitudinally therein about a central axis. A broken rod section 10 is illustrated in the drawings in FIGS. 1, 6 and 7. The rod section 10 is comprised of two separate pieces 15, 16. The piece designated by the numeral 15 extends from an end edge 20 toward an enlarged end 22. The remaining piece 16 extends from an end edge 21 to a reduced end 25. The end edges 20 and 21 are complementary. When joined together, they define a fracture line 17 where the rod section 10 was broken.

It is the intended purpose of the present invention to facilitate rejoining of the pieces 15 and 16 along the fracture line 17 as shown in FIG. 7 by providing an insert 26 which enables the rod section 10 to be mended from inside the bore 12.

Insert 26 is illustrated in detail by FIGS. 2 and 3. It is formed of a flexible material and comprises a tapered exterior surface 27 and a central longitudinal bore 28. The exterior surface 27 and bore 28 are tapered similarly to the taper of the rod bore 12. Surface 27 extends between a reduced end 30 and an enlarged end 31. I have found that actual rod blanks cut to conform to the cofiguration of insert 26 are sufficiently flexible to enable repair of the rod without adding excessive longitudinal rigidity at the previously broken section 10.

The open end edges 20 and 21 of pieces 15 and 16 border a single section of the bore 12 and therefore include a common cross sectional diameter. The relationship of this diameter compared to the cross-sectional diameters of the insert ends 30 and 31 is important to the operation of this invention. The enlarged end 31 includes a cross-sectional diameter substantially greater than the diameter of the bore 12 at the fracture line 17. Exterior surface 27 tapers uniformly from the enlarged end 31 to the reduced end 30. End 30 includes a cross-sectional diameter substantially less than the diameter of the bore 12 at fracture line 17. Since the exterior surface 27 is uniformly tapered between ends 31 and 30, it follows that at some point along the length of insert 26 there exists a cross-sectional insert diameter equal to the diameter of bore 12 at the fracture line 17. Such a diameter is located along insert 26 at an insert mid section 32.

A plurality of elongated slots 34 extend longitudinally along the insert 26 from the enlarged end 31. They terminate adjacent the mid section 32. The slots 34 are essential to the present invention since they enable the enlarged end 31 to be radially compressed to a diameter substantially less than the diameter of the bore 12 at the fracture line 17. This compressibility enables the enlarged end 31 to be inserted within piece 15 through the opening at end edge 20. Once within the bore 12, the enlarged end 31 is free to return to a normal condition which, since exterior surface 27 is tapered similarly to the taper of bore 12, allows surface to surface contact between piece 15 and the insert 26 from the enlarged end 31 to mid section 32.

For a permanent repair, an adhesive may be applied either to the enlarged end 31 or within the bore 12 adjacent end edge 20 to permanently adhere the insert 26 to the rod section 10. Before the adhesive is allowed to "set," the insert is positioned within the bore so that the diameter of the bore 12 adjacent the fracture line 17 is aligned with that part of mid section 32 including an equal exterior diameter. In this position the reduced end 30 protrudes outwardly from the end edge 20 (FIG. 6) to provide a surface complementary to the interior bore 12 of piece 16 adjacent its respective end edge 21. If adhesive is utilized, it is placed either on the exterior surface 27 of the insert 26 adjacent reduced end 30, or it is placed within the bore 12 adjacent end edge 21 prior to insertion of the reduced insert end 30 into the piece 16. The complete assembled condition of the pieces 15 and 16 and relative position of the insert 26 is illustrated in FIG. 7.

A hollow elongated sleeve 35 is illustrated in FIGS. 4, 5, 6 and 7 that fits within the bore 28 of insert 26. Sleeve 35 includes a tapered exterior surface 36 complementary to the tapered bore 28 of insert 26. Sleeve 35 further includes an enlarged end 39 and a reduced end 40. The enlarged end 39 includes a cross-sectional diameter greater than the cross-sectional diameter of bore 28 at the mid section 32. The reduced end 40 preferably includes a cross sectional diameter substantially less than the diameter of bore 28 at the reduced insert end 30. Sleeve 35 may also be formed from actual rod blank material to permit the highest possible degree of flex at the broken rod section.

In operation, the sleeve 35 is loosely fitted within the bore 28 at a longitudinal position therein to enable the enlarged end 22 to be compressed to a diameter less than the diameter of bore 12 at fracture line 17. The assembled sleeve 35 and insert 26 are then positioned within piece 15 as illustrated in FIG. 6. With the sleeve 35 still freely slidably carried within bore 28, the insert 26 is longitudinally adjusted within bore 12 to bring mid section 32 into position adjacent end edge 20. This is accomplished by moving the insert end 30 longitudinally away from end edge 20 until a firm surface to surface fit or circumferential contact is arrived at between the insert adn bore 12. When the insert is in position, the reduced end 40 of sleeve 35 is drawn outwardly away from the reduced insert end 30 until a similar surface to surface fit or circumferential contact is achieved between the insert bore 28 and surface 36 of sleeve 35. The sleeve 35 thereby prevents radial compression of the enlarged insert end 31 locking it within bore 12. The remaining piece 16 is then placed over the exposed portion of insert 26 with the end edges 20 and 21 engaging along fracture line 17 (FIG. 7).

Adhesives may be utilized to adhere the sleeve 35 to insert 26 as the insert 26 is adhered to the bore 12.

The method of operation of the present invention may now be understood from the above description and attached drawings. If the insert 26 is utilized alone to repair the broken section 10, the first step is to compress the enlarged end 31 to a diameter substantially smaller than the cross-sectional diameter of the bore 12 adjacent fracture line 17. The next step then is to insert the enlarged end 31 into the bore 12 within piece 15. The insert 26 is then longitudinally positioned within the bore so that a surface to surface engagement of the insert with the bore is accomplished. The next step is simply to place the remaining end 16 over the exposed section of insert 26 to butt the end edges 20 and 21 together at the fracture line 17.

If the sleeve 35 is utilized, it is placed loosely within the insert bore 28 prior to positioning of the insert within bore 12. Again the enlarged end 31 is compressed and the assembled insert and sleeve are positioned within the bore 12 of piece 15. As described above, the insert 26 is then positioned within the bore to facilitate surface to surface engagement at the exterior surface 27 with the walls of bore 12. The sleeve 35 is then similarly positioned within the insert bore 28 so that its exterior surface 36 comes into complete surface to surface engagement with the interior walls of the insert bore 26. When thus positioned, the final step simply involves placing the remaining piece 16 over the exposed section of insert 26 and butting the end edges 20 and 21 together (FIG. 7).

It may have become obvious from the above description and attached drawings that various changes and modifications may be made therein without departing from the intended scope of this invention. Therefore, only the following claims are to be taken as definitions of my invention.

What I claim is:

1. A repair device for a hollow fishing rod of the type having a uniformly tapered exterior surface and a similarly tapered bore extending along a longitudinal central axis, a section of said rod having been broken into two separate pieces, the broken open ends being defined by complementary end edges along a fracture line about the section, with one of the pieces tapering from its end edge to an enlarged end and the remaining piece tapering from its respective end edge to a reduced end, said device comprising:

an elongated insert having an exterior surface tapered to match the taper of said bore and extending longitudinally along a central axis from an enlarged end to a reduced end, the cross-sectional diameters of said ends being respectively greater and smaller than the cross-sectional diameter of the bore at the fracture line, and further including a mid section between the enlarged and reduced ends having a cross-sectional diamter equal to the cross-sectional diameter of the bore at the fracture line; and a slot extending longitudinally from the enlarged insert end to said mid section to allow radial compresssion of the enlarged end, thereby permitting said enlarged end to be placed within the bore of said one piece and located therein so the mid section is positioned along the end edge of said one piece with the reduced insert end protruding outwardly therefrom, whereby said remaining piece may be adjoined to said one piece by inserting said protruding reduced insert end into the broken open end of the remaining piece and butting the complementary end edges against each other.

2. The repair device set out in claim 1 wherein said elongated insert is tubular in configuration, having a longitudinal insert bore extending the full length of the insert and further comprises:

an elongated sleeve having a longitudinally tapered exterior surface slidably receivable within the bore of said elongated insert, said sleeve having a cross-sectional diameter at an enlarged end thereof greater than the cross-sectional diameter of the insert bore at said mid section and a cross-sectional diameter at a reduced end thereof less than the cross-sectional diamter of the insert bore at said mid section.

3. The repair device set out in claim 2 wherein said insert bore is tapered similarly to the taper of its exterior surface and wherein the exterior surface of the sleeve is tapered similarly to the taper of said insert bore.

4. A method for repairing a hollow fishing rod of a type having a uniformly tapered exterior surface and a similarly tapered bore extending along a longitudinal central axis, a section of said rod having been broken into two separate pieces, the broken open ends of which are defined by complimentary end edges at a fracture line, one of the pieces being tapered from its broken open end to an enlarged end and the remaining piece being tapered from its respective broken open end to a reduced end, said method comprising the steps of:

compressing an enlarged end of an elongated insert having an exterior surface tapered to match the taper of said bore and extending longitudinally along a central axis from an enlarged end to a reduced end, the cross-sectional diameters of said ends being respectively greater and smaller than the cross-sectional diameter of the bore at said fracture line and further including a mid section between the enlarged and reduced ends, the mid section including a cross-sectional diameter equal to the cross-sectional diameter of the bore at the fracture line, said insert further having a slot extending longitudinally from the enlarged insert end to said mid section to thereby allow said radial compression of said enlarged end to a diameter less than the diameter of said bore at the fracture line;

inserting the enlarged end of said insert into the open end of said one piece;

positioning said insert longitudinally within the bore so the exterior surface of the insert fits flush with the walls of the bore with the reduced end of said insert protruding outwardly from the end edge of said one piece; and inserting the reduced end of the insert into the open end of the remaining piece so the complementary end edges fit together along the fracture line.

5. The method set out in claim 4 further comprising the steps of:

inserting an elongated sleeve, prior to the step of inserting the enlarged end of said insert into the open end of said one piece, within a tapered insert bore, said bore being located within said insert and extending longitudinally between the ends thereof, said sleeve having a longitudinally tapered exterior surface with a cross-sectional diameter at an enlarged end greater than the cross-sectional diameter of the insert bore at said mid section section and a reduced end having a cross-sectional diameter less than the cross-sectional diameter of the insert bore at said mid section;

slidably positioning the sleeve axially within the insert bore to prevent circumferential contact of the sleeve and insert and thereby enable the enlarged end of the insert to be compressed to a cross-sectional diameter less than the cross-sectional diameter of said bore adjacent said fracture line;

wherein the step of inserting the enlarged insert end also includes simultaneous insertion of said enlarged sleeve end into said one piece;

subsequent to the step of positioning said insert longitudinally within the bore so the exterior surface of the insert fits flush with the walls of the bore and with the reduced end of the insert protruding outwardly from the end edge of said one piece, the step of positioning the sleeve axially within the insert bore so the exterior surface of the sleeve is in circumferential contact with the walls of the insert bore.

6. The method set out in claim 4 further including the steps of:

applying an adhesive between the exterior surface of the insert and the walls of said bore.

7. The method set out in claim 5 further comprising the steps of:

applying an adhesive between the exterior surface of the insert and the walls of said bore; and applying an adhesive between the exterior surface of said sleeve and the walls of said insert bore.

* * * * *